May 12, 1964

R. B. JOHNSON 3,133,159

MAGNETIC RECORD-PLAYBACK HEAD

Filed Nov. 9, 1959

Robert B. Johnson
INVENTOR.

BY R. Frank Smith
Robert F. Crocker
ATTORNEYS

United States Patent Office 3,133,159

Patented May 12, 1964

3,133,159

MAGNETIC RECORD-PLAYBACK HEAD

Robert B. Johnson, Rochester, N.Y., assignor to Eastman Kodak Company, Rochester, N.Y., a corporation of New Jersey Filed Nov. 9, 1959, Ser. No. 851,693
9 Claims. (Cl. 179—100.2)

This invention relates to a novel magnetic head for use in conjunction with the magnetic recording and reproducing of sound signals and which is particularly adapted for use in conjunction with 8 mm. sound motion picture cameras or projectors.

In recent years, the use of a magnetic sound system has become quite common in the motion picture art in place of the relatively more complex and expensive optical sound systems previously used. However, many problems have arisen in conjunction with the use of magnetic sound, particularly in conjunction with the narrow 8 mm. motion picture systems. As is obvious from a mere inspection of a section of 8 mm. motion picture film, there is relatively little room on the film for a sound track and, in fact, it is now fairly well settled that an 8 mm. sound track will be located between the perforations and the edge of the filmstrip and will have an overall width of only about .03 inch. In order to avoid amplitude modulation due to variations in the edge portions of such tracks, the magnetic head itself should preferably be appreciably narrower than the track and should be aligned medially of the track. As a result, the problem of obtaining a satisfactory signal level while maintaining an adequately low signal-to-noise ratio has been extremely severe and has imposed almost impossible restrictions upon the manufacture of suitable heads for such equipment.

It is, therefore, an object of this invention to provide a construction of magnetic record-playback head which will overcome the above problems. In this connection, my improved head construction is of such character that it may be assembled by relatively unskilled workers, is relatively inexpensive, and yet is capable of producing a readily usable output signal.

A further object of this invention is to provide such a magnetic head, the individual components of which are so inter-related with one another that the heads may be readily assembled in such a way that successive heads will exhibit substantially identical electrical and magnetic characteristics.

Further objects will become readily apparent from the following description and claims, particularly when considered in the light of the accompanying drawing wherein:

Figure 1:
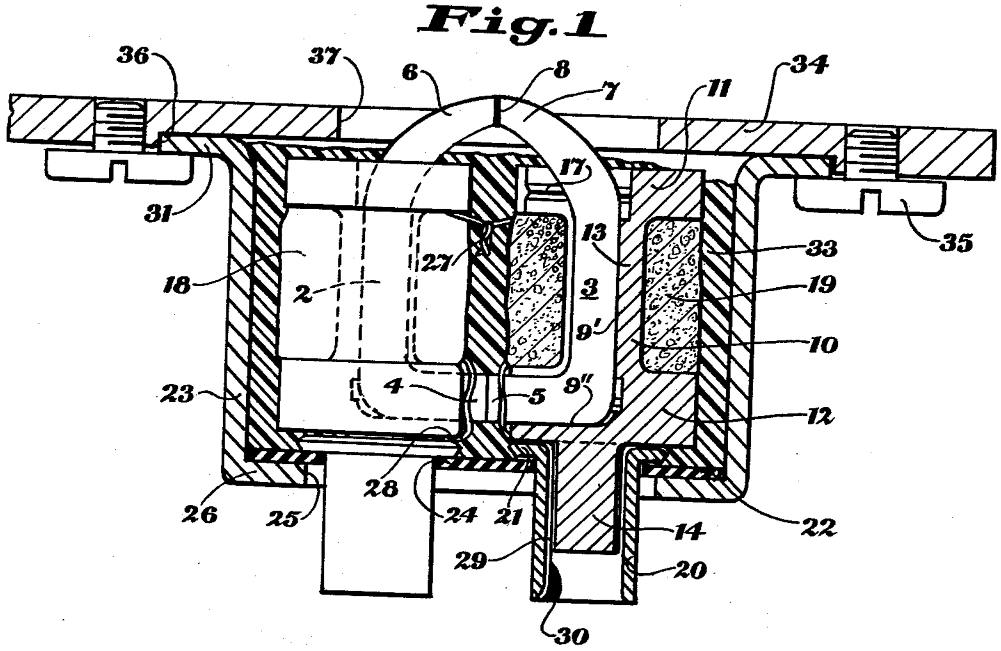
FIGURE 1 is a longitudinal sectional view of my magnetic head.
Figure 2:
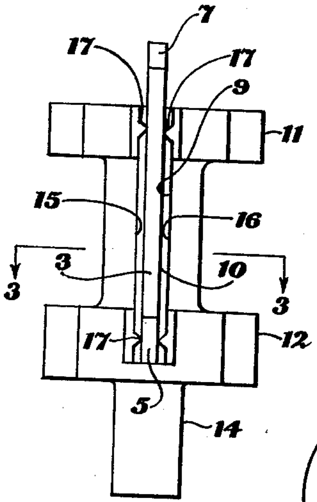
FIGURE 2 is a side elevational view of one of the core and bobbin assemblies utilized in constructing the head.

For purposes of the following description, the magnetic head of my invention will be considered as being oriented in the FIGURE 1 position, although it should be distinctly understood that in actual use the head may be oriented in any desired position. Thus, as best shown in FIGURE 1, my magnetic head comprises a pair of generally C-shaped core pieces 2, 3, the lower end portions 4 and 5 of which are in direct contact with one another while the upper end portions 6 and 7 are slightly separated from one another by a thin copper shim 8. Thus, there is formed by these two core pieces a ring-shaped core assembly having an extremely narrow non-magnetic gap produced by the shim 8. Each of the core pieces is seated within a radial slot 9 formed in a nylon bobbin or spool 10 having an upper flange 11, lower flange 12, central cylindrical body or spindle portion 13, and an integral shank 14 generally coaxial with the body portion 13 and extending below the lower flange 12. The slot 9 extends radially to a point slightly past the center of the spool body 13 and extends downwardly, as shown, to a point part way through the lower flange 12. The resulting back and bottom walls 9′ and 9″ respectively serve to support and position the corresponding core piece in the desired relation thereto. The sidewalls 15, 16 of the slot 9 are preferably provided near their upper and lower ends with opposed parallel ribs 17, the spacing between which is such that they are adapted to closely receive the core piece therebetween with a relatively firm friction grip. As is best shown in FIGURE 1, a pair of coil sections 18, 19 are wound about the central body or spindle portions of the bobbin and core assemblies between the flanges 11 and 12. As indicated at 27 these two coil portions are connected together in electrical series relationship and are wound in the opposite sense so that any voltage developed in one section by stray magnetic flux will be bucked out by that developed in the other section.

Surrounding each of the shanks 14 of the spools 10 is a flanged sleeve or eyelet 20, preferably of silver plated brass. The flange 21 of each of these sleeves serves, in conjunction with a vulcanized fiber insulating strip 22 to position the core assembly in predetermined relationship to a housing 23, preferably formed from mu-metal. As shown in FIGURE 1, the sleeves extend downwardly through individual holes 24 in the strip 22 and then through an elongated slot 25 in the bottom wall 26 of the housing. The free ends 28 and 29 of the two coil sections 18, 19 are passed downwardly through the interior of the eyelets and are preferably soldered thereto as indicated at 30. Thus, the sleeves 20 serve both to help locate the core assembly in the housing 23 and as electrical connections to the head coil.

Figure 4:
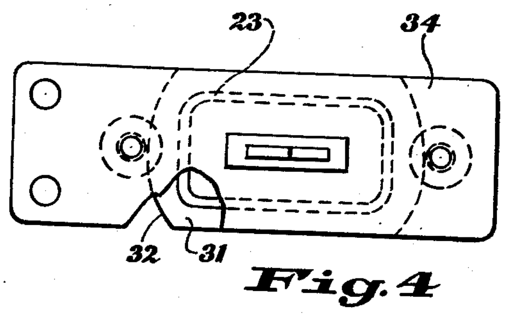
FIGURE 4 is a top plan view of the head assembly.
Figure 3:
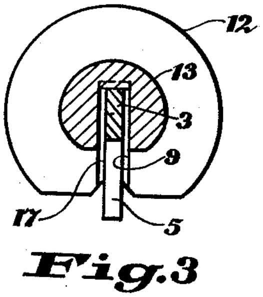
FIGURE 3 is a sectional view taken on the line 3—3 of FIGURE 2.

The upper ends of the housing wall are preferably flared outwardly as shown in FIGURES 1 and 4 to provide a continuous flange 31, the ends 32 of which are arcuately curved about the vertical axis of symmetry of the head as shown in FIGURE 4. The housing, after the head assembly has been properly positioned therein, is preferably filled with a suitable potting resin such as an epoxy resin, and is then secured, as by suitable clamping screws 35, to a mounting plate 34 which is also preferably formed of mu-metal. As shown in FIGURE 1, the surface of plate 34 is undercut slightly as at 36 to mate with the curved end portions 32 of the housing flange 31. The central portion of the coverplate 34 is also provided with a suitable slot 37 through which the upper end portions of the core assembly 2, 3 project to a level slightly above the plane of the plate 34. Due to the arcuate shape of the end portions 32 of the housing flange the housing may be adjustably positioned about its vertical axis of symmetry with respect to the mounting plate 34 to obtain the desired "azimuth" adjustment of the head relative to the magnetic sound track with which it will be associated. Once the proper adjustment is made screws 35 are tightened to hold it in this adjusted position. Slot 37 is, of course, of sufficient size to permit the desired range of adjustment without interference with the core.

Because of the construction described above, assembly and adjustment of my improved magnetic head is readily attained by relatively unskilled workmen. In assembly, the C-shaped core sections 2 and 3 are first individually assembled with their respective spools or bobbins 10 and are preferably firmly secured thereto by means of a suitable adhesive. As previously stated, the back and bottom walls of the slots 9 together with the ribs 17 will positively locate the core section in the desired position. The shank 14 of each spool is then put into a winding fixture and the coil section is wound about the body or spindle portion of the spool and its associated core section. The two core and coil sections are then placed in a suitable clamping jig and secured rigidly together with the shim 8 interposed between the upper core portions 6 and 7. A suitable epoxy resin may be used to hold the two sections rigidly together. The coil sections are connected in series as at 27 and the free ends 28 and 29 are then passed through the sleeves 20 and soldered thereto, the sleeves being slipped over the shanks 14 of the bobbins. The spacer strip 22 is then slipped over the two sleeves and the resulting assembly is inserted into the interior of the housing 23, the strip 22 serving, in conjunction with the housing walls and the flanges 21 of the sleeves 20 to properly position the assembly in the housing. The interior of the housing is then filled, as previously described, with the resin potting compound and, after this has set, the housing and core assembly are secured to the mounting plate 34 by the clamping screws 35.

Because of the manner in which the core sections are supported and positioned by the slots in the bobbins and the manner in which the sleeve flanges and spacer strip 22 cooperate to position the assembly in the housing, a high degree of reproducibility of both electrical and magnetic characteristics of the heads is readily attainable. Stray hum pick-up, which is a very serious problem particularly at the low signal levels inherent when such narrow heads and soundtracks as are here contemplated are involved, is held to a most acceptable level by virtue of the almost complete shielding produced by the mu-metal housing 23 and mounting plate 34 as well as by the expedient of making both coils 18 and 19 substantially mirror images of one another both as to physical layout and as to the number of turns per each winding. In this way, any stray magnetic fields which manage to pass through the housing 23 will produce equal and opposite voltages in the two coil sections so that the resulting stray hum voltage will be substantially zero.

Operation of the head will be similar to that of the usual magnetic heads. The head will be so mounted that the gap portion of the core will be in intimate contact with the soundtrack on the motion picture film or other magnetic tape and, as the track moves past the head, voltages will be induced in the series connected windings 18 and 19 which will appear across the terminals formed by sleeves 20. These signal voltages will, of course, then be amplified by associated equipment in the usual fashion.

It should be pointed out that magnetic heads of the type under consideration are extremely small and that their apparent size, as shown in the drawings, has been greatly exaggerated in order to better show the construction. For example, heads constructed in accordance with this invention for use with 8 mm. sound motion picture film may have core sections 2 and 3 which are only approximately ¼ inch from top to bottom, whereas the bobbins which carry these core sections may be only approximately 5⁄16 inch in overall length. Thus, it can be readily seen that a construction, such as has been described above, and which so effectively overcomes the usual difficulties of assembling such small components, is of considerable importance.

It is emphasized that the magnetic head construction described is capable of considerable variation and that the specific construction shown is for purposes of illustration only. It will be obvious to those skilled in the art that many changes in the materials, relative sizes and shapes of the components, etc., can be made without departing from the spirit and scope of the invention as defined by the appended claims.

I claim:

1. A magnetic transducing head comprising a pair of oppositely disposed, generally C-shaped magnetic core pieces, each having upper and lower legs and a generally vertical intermediate leg, said core pieces being secured together with the end portions of their lower legs in direct contact with one another, and a spacer of non-magnetic material interposed between the end portions of their upper legs, a pair of spools of insulating material associated respectively with each of said core pieces and each spool having spaced upper and lower flanges and an integral shank extending axially downwardly below said lower flange, said spool being provided with a generally radial slot extending inwardly from the periphery thereof and having its upper end opening through the upper flange of said spool, the associated core piece being secured in said slot with its vertical and lower legs respectively abutting the back and bottom walls of said slot, a pair of coils in electrical series wound respectively about each of said spools between said flanges, a pair of sleeves of conductive material carried respectively by each of said shanks, and leads from said coils individually connected to said sleeves.

2. A magnetic transducing head as set forth in claim 1 including a shielding housing having openings in its upper and lower walls, said core and spool assemblies being secured within said housing with the upper portion of said core pieces protruding slightly above said upper wall and said sleeves protruding below the lower walls through said openings.

3. A magnetic transducing head as set forth in claim 2 wherein said sleeves are provided with outwardly extending flanges on their upper ends, and a strip of insulating material, having a pair of spaced openings therethrough adapted to receive the body of said sleeves, is interposed between said flanges and the bottom wall of said housing.

4. A core and bobbin assembly for use in a magnetic transducer, comprising a generally C-shaped core piece of magnetic material having upper and lower leg portions connected by a generally vertically extending intermediate portion, and a spool of non-magnetic material having axially spaced upper and lower flanges and an elongate intermediate spindle portion joining the flanges, said spool being provided with a generally radial slot extending inwardly from the periphery of the spool and having its upper end opening through the upper flange of the spool, and the slot extending axially downwardly through the spindle portion to and terminating in a bottom wall located at a level intermediate the upper and lower surfaces of the said lower flange, said core piece being secured within said slot with its intermediate vertical and lower leg portions respectively abutting the back and bottom walls of the slot with said spool extending downwardly beyond said lower leg, the lower leg portion being entirely below the upper surface of the lower flange and the intermediate vertical portion of the core piece being disposed in the slot within the spindle portion and entirely within the periphery of the spindle portion, and the periphery of the spindle portion and the inner surfaces of the flanges defining limiting surface means for receiving a wound electrical coil with the intermediate vertical portion of the core piece extending therewithin.

5. A core and bobbin assembly as in claim 4 wherein said slot is formed to closely receive and confine said core piece therein.

6. A core and bobbin assembly as in claim 4 wherein the inner facing walls of said slot are provided with opposed ribs extending toward one another, the spacing between said ribs being substantially equal to the thickness of said core piece.

7. A core and bobbin assembly for use in a magnetic transducer, comprising a generally C-shaped core piece of magnetic material having upper and lower leg portions connected by a generally vertically extending intermediate portion, a spool of non-magnetic material having axially spaced upper and lower flanges and an intermediate spindle portion adapted to carry a coil in surrounding relation thereto between said flanges, said spool being provided with a generally radial slot extending inwardly from the periphery and having its upper end opening through the upper flange of said spool, and said slot extending downwardly through said spindle portion to and terminating in a bottom wall located at a level intermediate the upper and lower surfaces of said lower flange, said core piece being secured within said slot with its vertical and lower legs respectively abutting the back and bottom walls of said slot and with said spool extending downwardly beyond said lower leg, the spool being of electrically insulating material and including an integral shank extending axially downwardly from said lower flange, a sleeve of electrically conductive material carried on said shank of said spool, and a coil wound on said spool and having a lead electrically connected to said sleeve.

8. A core and bobbin assembly as in claim 7 wherein said lead passes downwardly from said coil through the interior of said sleeve.

9. A magnetic transducing head comprising a pair of oppositely disposed core and coil assemblies secured together, each of said assemblies comprising a spool of electrically insulating material having axially spaced upper and lower flanges and an integral shank extending axially downwardly from said lower flange, said spool being provided with a slot extending generally radially inward from the periphery thereof, the median plane of said slot containing the longtudinal axis of said spool and said slot opening through the upper flange of said spool and extending downwardly partially through said lower flange, and a generally C-shaped magnetic core-piece having upper and lower laterally extending leg portions connected by a generally vertically extending intermediate leg portion, said core-piece having its lower and intermediate leg portions fitting within said slot so that said intermediate leg portion extends substantially axially of said spool, and said assemblies being oppositely disposed with their upper and lower legs extending toward one another, a thin spacer of non-magnetic material being secured between the ends of the upper legs, and the ends of the lower legs being in intimate abutting contact with one another, a casing of high magnetic permeability having an opening through the bottom wall thereof adapted to freely pass said shanks, a sheet of insulating material adapted to fit against the inside face of said bottom wall and having a pair of openings therethrough, a sleeve of conducting material carried by each of said shanks, the inner ends of said sleeves being provided with a flange adapted to lie against the inner face of said sheet with the body of said sleeve and the shank enclosed thereby extending through said openings to the exterior of said casing, and a pair of series connected coil portions wound on said spools with their leads electrically connected to said sleeves.

References Cited in the file of this patent

UNITED STATES PATENTS

| | | |
|---|---|---|
| 2,590,292 | Anderson | Mar. 25, 1952 |
| 2,628,286 | Rettinger | Feb. 10, 1953 |
| 2,708,694 | Begun et al. | May 17, 1955 |
| 2,800,534 | Bradford et al. | July 23, 1957 |
| 2,813,932 | Kornei | Nov. 19, 1957 |
| 2,861,134 | Gernert | Nov. 18, 1958 |
| 2,951,912 | Sherman | Sept. 6, 1960 |
| 2,998,292 | Lubkin et al. | Aug. 29, 1961 |